United States Patent

[11] 3,621,945

| [72] | Inventor | William J. Spry |
| | | Lewiston, N.Y. |
| [21] | Appl. No. | 875,841 |
| [22] | Filed | Nov. 12, 1969 |
| [45] | Patented | Nov. 23, 1971 |
| [73] | Assignee | The Carborundum Company |
| | | Niagara Falls, N.Y. |

[54] DISC BRAKES
5 Claims, 6 Drawing Figs.

[52] U.S. Cl. .................................. 188/71.5,
188/73.2, 188/218 XL, 188/251 R, 192/70.2,
192/107 M, 287/53 SS
[51] Int. Cl. .................................. F16d 55/36
[50] Field of Search ........................... 188/71.5,
218, 73.1, 73.2, 251 A, 251 R; 192/70.16, 70.19,
70.2, 107 R, 107 M; 287/53 SS; 64/9 R

[56] References Cited
UNITED STATES PATENTS

| 698,122 | 4/1902 | Hall ............................ | 192/70.2 |
| 2,330,856 | 10/1943 | Adamson ..................... | 192/70.14 |
| 3,473,637 | 10/1969 | Rutt ............................ | 188/251 R |

FOREIGN PATENTS

| 910,464 | 11/1962 | Great Britain ................ | 192/70.2 |

*Primary Examiner*—George E. A. Halvosa
*Attorney*—K. W. Brownell

ABSTRACT: Friction discs for use in multiple disc brakes, e.g., carbon friction discs for use in aircraft brakes, are provided with scalloped perimeters for coaction with driving or restraining elements having similar scalloped perimeters. Both sets of scallops have substantially flat contact surfaces disposed at an angle which optimizes the distribution of force on the friction disc. The friction disc scallops interfit between and engage the coacting element scallops, but are capable of limited expansion and rotary movement between the coacting element scallops.

INVENTOR.
WILLIAM J. SPRY
BY
ATTORNEY

DISC BRAKES

BACKGROUND OF THE INVENTION

This invention relates to disc brakes. Like other mechanical brakes, these brakes arrest the rotary motion of mechanical parts by converting mechanical energy to heat. The heat is produced by rubbing together two friction surfaces. In disc brakes, at least one of the friction surfaces is the face of a disc which rotates relative to another friction surface. Multiple disc brakes are constructed from a plurality of friction discs, some of which ("rotating discs") are fixed relative to the rotating parts and others of which ("stationary discs") are fixed relative to the nonrotating parts of the apparatus. The surfaces of the rotating and stationary discs are pressed against each other by axial forces to cause braking. Generally speaking, the kinetic energy absorbed per unit time is directly proportional to the pressure on the disc surfaces, the mean tangential velocity and the coefficient of friction of the disc surfaces at that velocity.

Disc brakes, like all brakes, must be capable of withstanding and absorbing or conducting away the heat created by braking. Otherwise the brake parts would be heated to temperatures at which they would fail, for example, by warping, fracture or disintegration.

Disc brakes have a variety of uses, one of which is for stopping aircraft. As aircraft become larger and larger and land at faster and faster speeds, it becomes increasingly difficult to provide them with satisfactory brakes. Aircraft brakes must be designed to stop the aircraft during normal landings with minimal friction surface wear. Aircraft brakes must also be designed to stop the aircraft following a rejected takeoff under the worst possible combinations of weight and speed. In this instance, the kinetic energy which the brakes must absorb will be three or four times as much as that absorbed during normal landings. This use of the brakes usually renders them unserviceable for further use.

An ever present consideration in design of aircraft brakes is the need to minimize weight. This presents a dilemma. As the weight of the brake is reduced its capacity as a heat sink is also reduced, and, therefore, its braking temperatures are increased. (Conventional multiple disc aircraft brakes reach temperatures in the range of 400°–500° C. during normal landings.) Unfortunately, increased temperatures result in increased brake wear. Increased temperatures also result in a reduction of the friction coefficient developed between rubbing surfaces. This may be fatal in the case of an emergency landing when the brake temperature may reach more than twice that reached in normal service. If temperatures become high enough in any landing, metal discs will warp which renders them unserviceable.

Efforts to improve aircraft disc brakes have been focused on the friction discs. They must be manufactured from materials that have sufficiently high heat capacity, thermal conductivity, coefficient of friction, tensile, compressive and shear strengths and resistance to wear, over the range of operational temperatures. Preferably, they should also be of light weight. Most discs are now fabricated from metal.

One recent development in brake discs is the use of beryllium metal. The following table includes thermal properties of beryllium and other metals used in friction discs.

TABLE I

| | Steel | Copper | Beryllium |
|---|---|---|---|
| Thermal Conductivity (B.t.u./ft.²/°F./hr./ft.) | 24 | 220 | 90 |
| Melting Point (°F.) | 2,732 | 1,976 | 2,345 |
| Heat Capacity (B.t.u./lb./°F.) | 0.113 | 0.093 | 0.425 |
| Temperature Range for Stated Heat Capacity | 64.4°–212° F. | 59°–212° F. | 32°–212° F. |

Attempts to use carbon (amorphous or partially or totally graphitized) for friction discs have usually been unsuccessful. Carbon has, however, excellent heat capacity (0.165 B.t.u./lb./°75.2 to 154.4° F.), thermal conductivity (10 to 100 B.t.u./ft.²/°F./hr./ft. depending on density), and a high coefficient of friction over the temperature range of use. Furthermore, carbon has no melting point, subliming at about 3,600° C. Thus, carbon can be used at temperatures much higher than those at which metals can be used. (Compare these properties of carbon with those of the metals in table I.) Unfortunately, carbon has poor tensile and shear strengths. Brake discs heretofore fabricated from carbon have shown a tendency to develop cracks and fractures which were either radial or approximately parallel to the circumference. It has recently been proposed to combat these strength problems by the use of discs containing carbon in permanent compression, i.e., comprising an inner carbon frictional part and an outer metallic retaining part. These brakes, however, require close coordination of the coefficients of thermal expansion of the carbon and metallic portions of the disc. Moreover, the discs are subject to possible warping and ultimate failure in the event uneven stresses occur.

SUMMARY OF THE INVENTION

It is, therefore, an object of this invention to provide a structure for brake discs, especially brake discs comprising a nonductile material such as carbon, which reduces the tendency of the discs to develop cracks and fractures. Another object is to avoid the necessity for coordinating coefficients of thermal expansion of the component materials which make up the discs. A further object is to reduce the tendency of such discs to warp. Yet another object is to provide for the most efficient use of the strengths of materials utilized for brake discs.

These and other objects are accomplished according to the present invention, which provides a friction disc for use in a disc brake, the disc having an inner perimeter and an outer perimeter, one perimeter having formed therein a plurality of equally spaced scallops, each scallop having a substantially flat contact surface disposed at an angle with respect to the radius of the friction disc passing through the center of the contact surface of the friction disc, such angle of each contact surface being substantially equal to each other such angle, and ranging from about 30° to about 60°. Such a disc is used in combination with a coaxially aligned coacting element, i.e., a driving or restraining element, the coacting element having a perimeter for engagement with the scalloped perimeter of the friction disc, said coacting element perimeter having formed therein a plurality of equally spaced scallops, equal in number to the friction disc scallops, each coacting element scallop having a substantially flat contact surface disposed at substantially the same angle with respect to the radius of the friction disc passing through the center of the contact surface as the angle of the corresponding contact surface of the friction disc; the friction disc scallops interfitting between the coacting element scallops and being capable of limited expansion and rotary movement therebetween.

DETAILED DESCRIPTION

Figure 1:
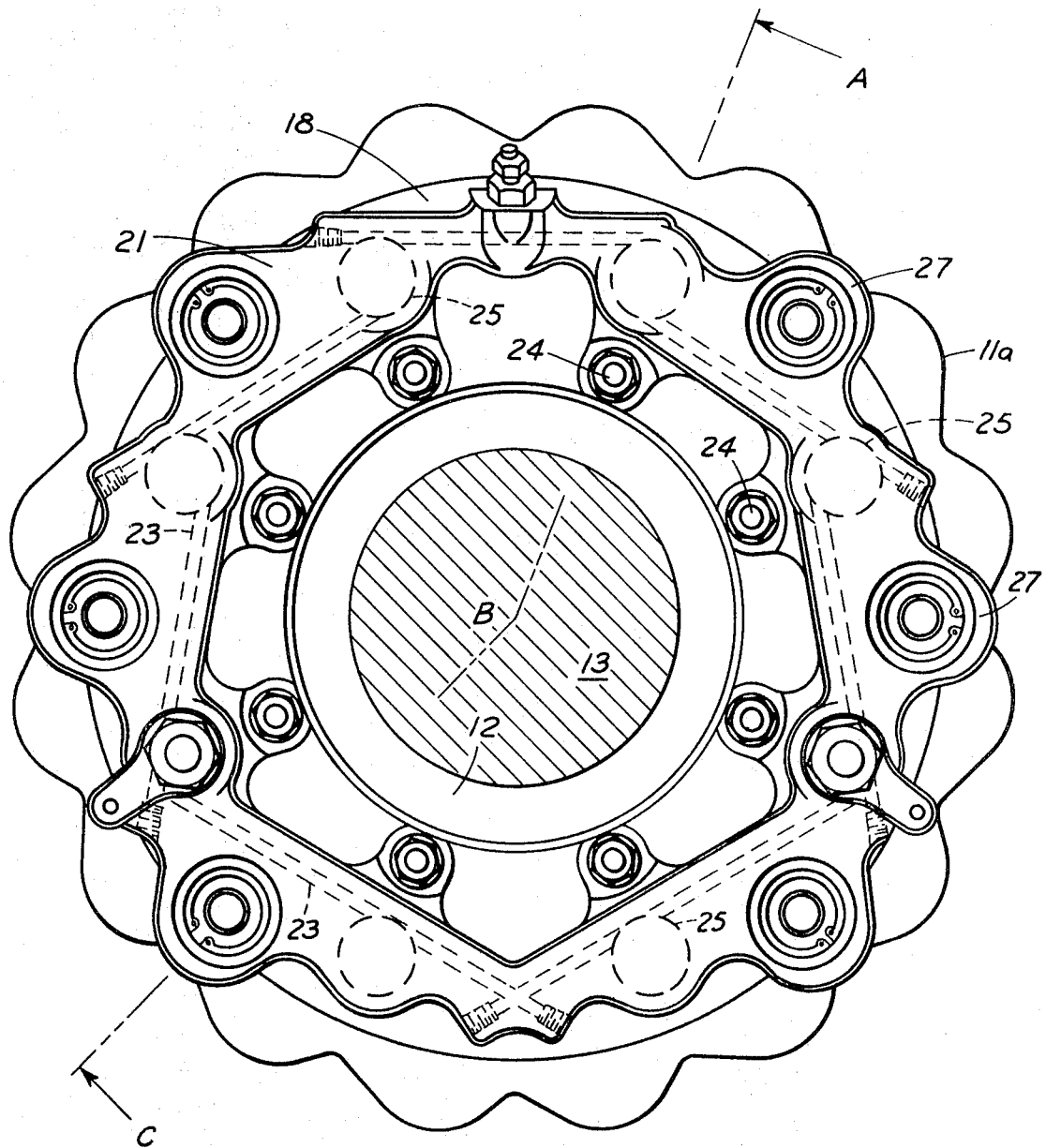
FIG. 1 is a side view of a multiple disc brake embodying various features of the present invention.
Figure 2:
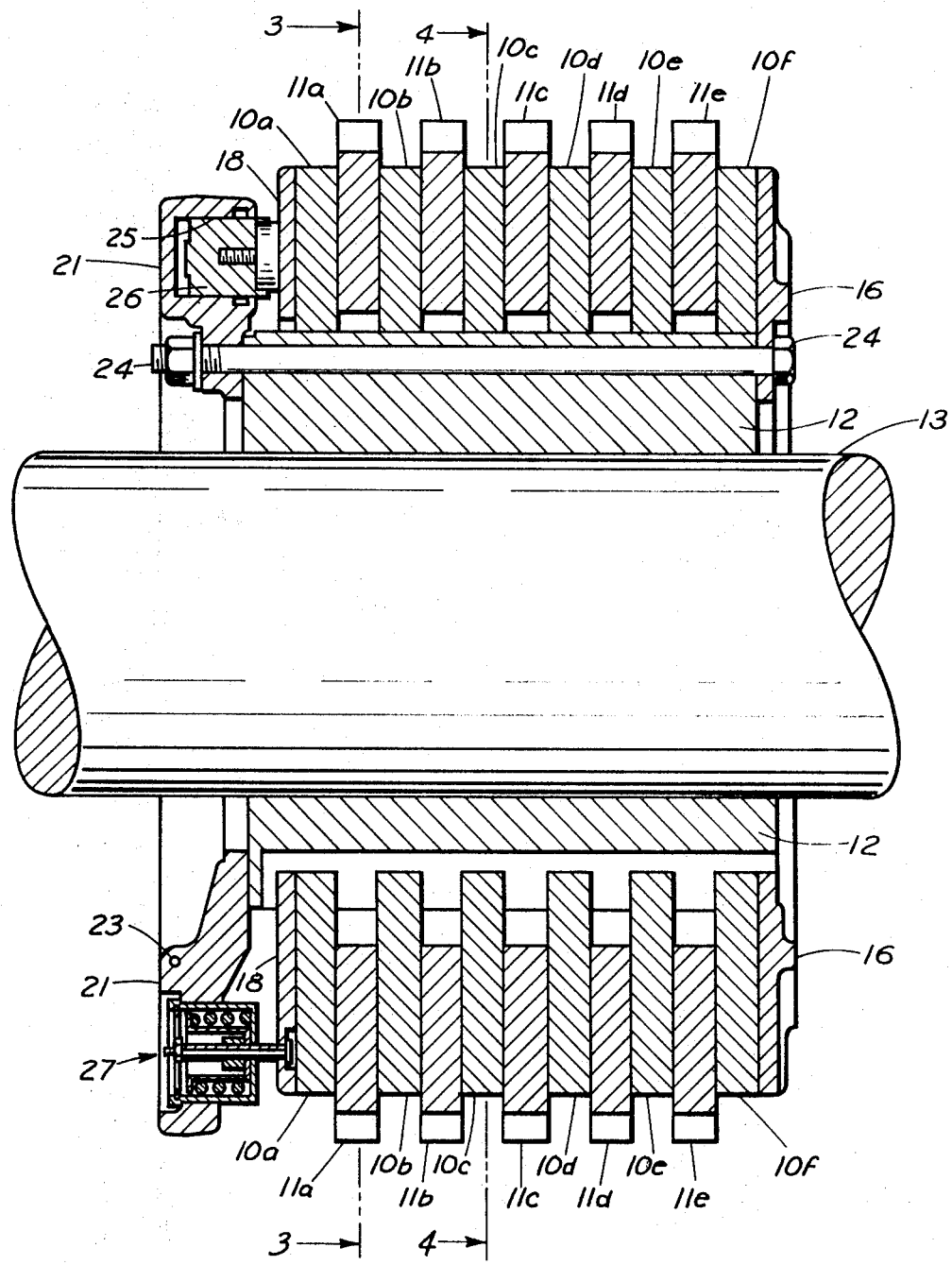
FIG. 2 is a rotated sectional view of the multiple disc brake of FIG. 1, taken along lines A–B and B–C of FIGURE 1.

The following detailed description is made with reference to FIG. 1 and 2, which illustrate a multiple disc brake, e.g., an aircraft brake. The disc brake comprises rotating friction discs 10a-10 and stationary friction discs 11a-11e which have central apertures and are coaxially aligned with and radially spaced about a central supporting shaft 13. The shaft 13 supports the rotating body whose rotary motion is to be arrested by the brake. The rotating body, which in the case of an aircraft brake is the wheel hub, is not shown in the drawings. The rotating discs 10a-10f have scalloped apertures, illustrated in FIG. 4, which engage the torque tube 12 which is fixed relative to the rotating hub. The rotating discs 10a-10f are slidably fixed so they can move parallel to the shaft 13, that is axially. The rotating discs 10a-10f and the stationary discs 11a-11e are alternately arranged along the shaft 13. The discs 10a-10f and 11a-11e are placed between a metal thrust plate 16 and a metal pressure plate 18 which also have central apertures and are placed about the shaft 13. The pressure plate 18 and thrust plate 16 are attached to the terminal rotating discs 10a and 10f, respectively. Adjacent the pressure plate 18 is a metal torque plate 21 which is fixed relative to the hub. Metal torque tube 12 is concentric with shaft 13 and passes through the apertures of the rotating and stationary friction discs 10a-10f and 11a-11e pressure plate 18. The torque plate 21, torque tube 12 and thrust plate 16 are secured together by a fastening means 24. Stationary discs 11a-11e do not engage torque tube 12, but allow the free rotation of the latter when the discs are not engaged. The stationary discs 11a-11e can also move axially.

Hydraulic cylinders 25 are located in the torque plate 21 spaced about the periphery of the torque plate 21. The cylinders may be in communication by means of passages 23 within the torque plate 21. The cylinders 25 contain pistons 26 which, during braking, urge the pressure plate 18 towards thrust plate 16, thus urging the rotating discs 10a-10f and stationary discs 11a-11e into mutual contact and against the thrust plate 16, whereby the arrest rotary motion of torque tube 12. The pressure applied to the friction surfaces is typically approximately 100 p.s.i. Spring means 27, attached to torque plate 21 and pressure plate 18, is provided to retract pressure plate 18 when braking is no longer desired.

Figure 3:
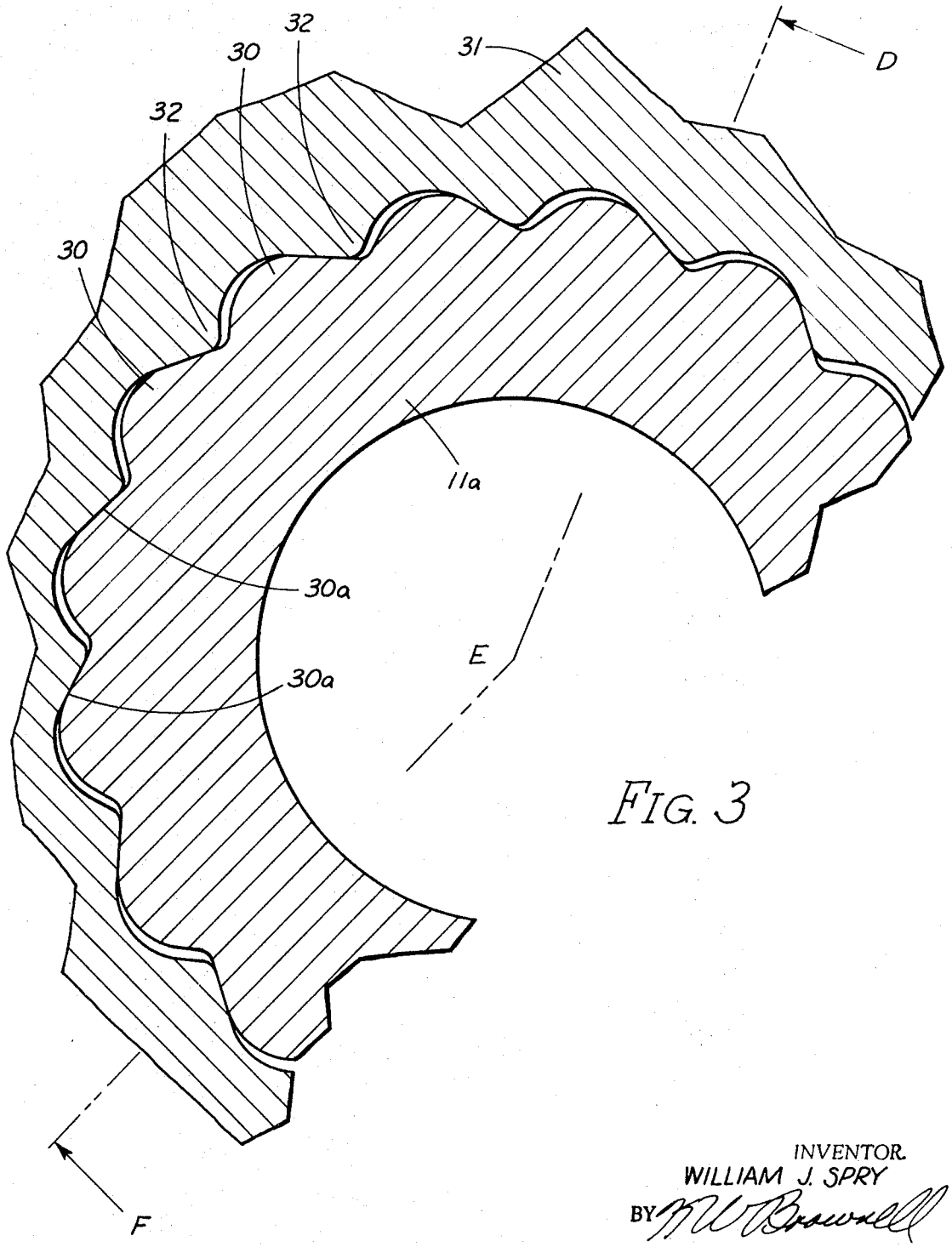
FIG. 3 is a sectional view of a stationary friction disc of the brake of FIGS. 1 and 2, taken along line 3—3 of FIG. 2, and illustrating the orientation of the stationary disc relative to the restraining structure.
Figure 4:
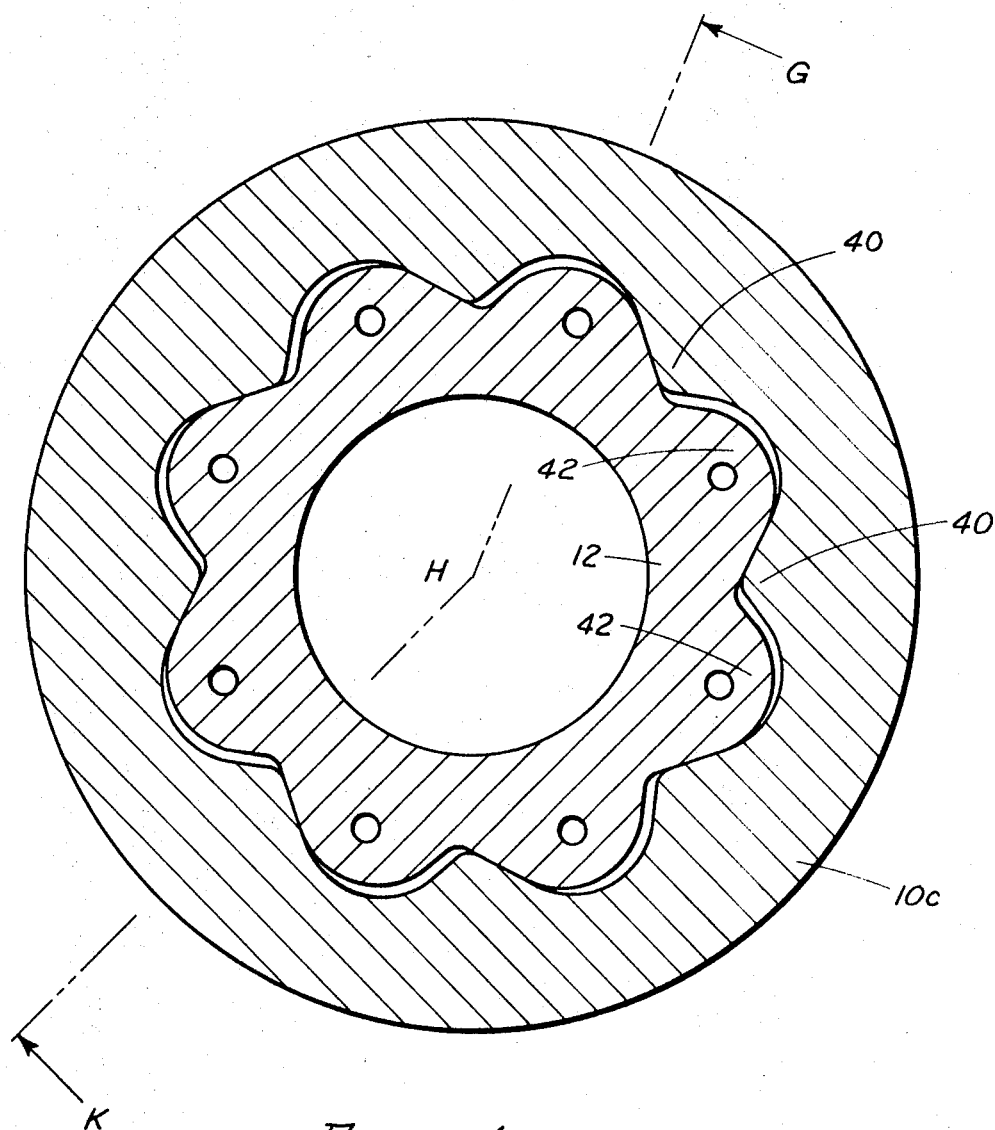
FIG. 4 is a sectional view of a rotating friction disc of the brake of FIGS. 1 and 2, taken along line 4—4 of FIG. 2, and illustrating the orientation of the rotating disc relative to the rotating body.

Friction discs, according to this invention, are illustrated in FIGS. 3 and 4. FIG. 3 is an illustration of stationary friction disc 11a whereas FIG. 4 is an illustration of rotating friction disc 40c. FIGS. 3 and 4 are sectional views taken along lines 3—3 and 4—4 of FIG. 2, respectively. Conversely, FIG. 2 cuts through lines D-E and E-F of FIG. 3, and through lines G-H and H-K of FIG. 4. The nonillustrated discs 10a, 10b, 10d-10f and 11b-11e are essentially the same as those illustrated, except that terminal rotating discs 10a and 10f are fixed relative to pressure plate 18 and thrust plate 16, respectively.

Referring now to FIG. 3, a stationary friction disc 11a is illustrated. It is to be understood that the word "stationary" as used herein does not mean immobile, but only relatively stationary, i.e., nonrotating. In particular, it was noted above the axial motion of the stationary disc is permitted along the axis of shaft 13. In addition, a limited amount of expansion and rotary motion are possible, although the rotary motion will amount to at most a few degrees.

The shape of the outer perimeter of friction disc 11a is highly significant. A plurality of scallops 30 are formed in the perimeter, preferably equally spaced. Each scallop 30 is provided with a substantially flat contact surface 30a. The restraining structure 31 is provided with scallops 32, which interfit between and engage friction disc scallops 30, the friction disc scallops 30 being capable of limited expansion and rotary movement between the scallops 32 of restraining structure 31. A loose working fit, i.e., about 0.005 inch per inch of radius of disc 11a, is a sufficient clearance for this purpose, but a greater clearance can be used if desired. The portion of restraining structure 31 which is illustrated in FIG. 3 is metal, and is fixed relative to the balance of the aircraft. The limited expansion and rotary movement permitted between disc scallops 30 and restraining scallops 32 allows for variation in the coefficients of thermal expansion of disc 11a and restraining structure 31, without loss of contact between disc scallops 30 and restraining scallops 32, and without warping of disc 11a.

The angle of the contact surfaces 30a of scallops 30 is chosen to optimize the distribution of force on friction disc 11a. This optimum force distribution is dependent upon the material from which disc 11a is constructed, its exact shape, and many other factors. It is usually, in the final analysis, determined by experiment. As a first rough approximation, however, the cotangent of the angle which the contact surface makes with the radius of disc 11a passing through the center of the contact surface should approximate the ratio of the shear strength to the compressive strength of the disc material, as described below.

Figure 5:
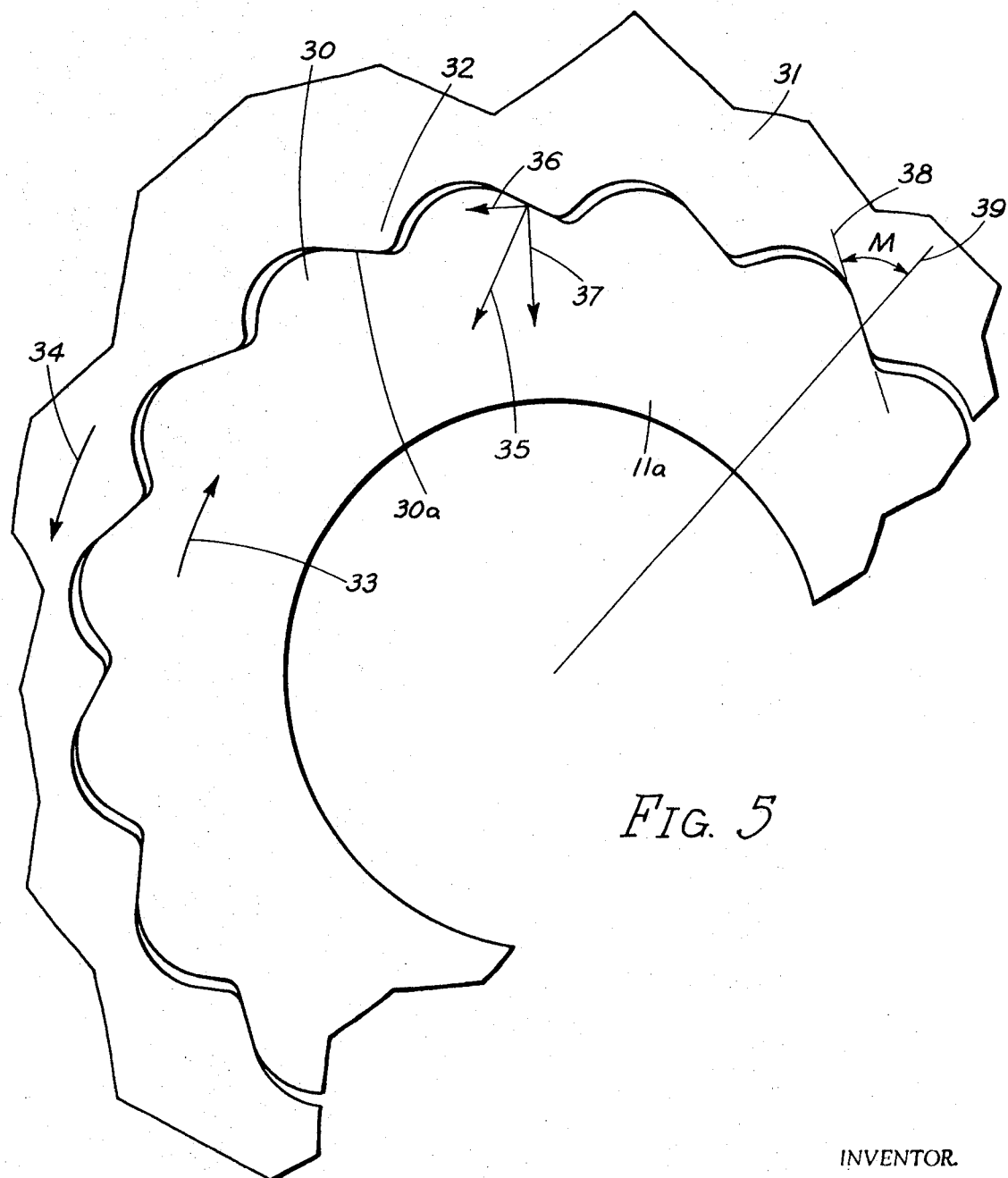
FIG. 5 is a schematic diagram of the stationary disc of FIG. 3, illustrating the angle of contact between the restraining structure and the stationary disc, and the resolution of forces incident upon the stationary disc.

The directions of thrust exerted by disc 11a and restraining structure 31 are illustrated in FIG. 5. Assuming the direction of rotation to be arrested to be clockwise with respect to FIGS. 3–6, rotating discs 10a and 10b urge stationary disc 11a clockwise as indicated by arrow 33. A complementary thrust counterclockwise is exerted by restraining structure 31 as illustrated by arrow 34. This complementary thrust exerts a force on the scallops 30 of disc 11a. This force is illustrated as arrow 35 (shown perpendicular to the contact surface of the scallop), with a tangential component 36 and a radial component 37. Actually, this force is not truly perpendicular, since the actual force felt by disc 11a includes a tangential component having a magnitude equal to the normal force times the coefficient of friction of the disc material. This tangential force is small, however, in comparison with the normal component and can, for the approximation which follows, be ignored. The relative magnitudes of the tangential and radial components are determined by the angle (which should be nearly the same for all scallops 30) of contact M between disc 11a and restraining structure 31, measured as the angle between the contact surface, indicated by line 38, and the radius passing through the center of the contact surface, indicated by line 39. This angle is the same as the angle between force 35 and tangential component 37, within the approximation allowed by ignoring the tangential component equal to the normal force times the coefficient of friction. The tangential component 36 then approximates the total force 35 times the cosine of angle M, and the radial component 37 is equal to the total force 35 times the sine of angle M. Angle M should therefore be selected with the relative shear and compressive strengths of disc 11a in mind, so that the tangential component 36 and radial component 37 of force 35 are borne in proportion to these respective strengths. In other words, angle M is chosen so that the ratio of the cosine of angle M to the sine of angle M (i.e., the cotangent of angle M) approximates the ratio of the shear and compressive strengths of the material of disc 11a. Thus, if the shear and compressive strengths of disc 11a were equal, angle M should be at 45°. A shear strength of two-thirds the compressive strength would indicate an angle M of about 56°. In general, angle M should range from about 30° to about 60°, depending on the relative shear and compressive strengths of the material of disc 11a. In considering the shear and compressive strengths, the effective values for the conditions of operation should be used, taking into account the shape of disc 11a, the directions of expected stress, and the expected temperatures of use.

An important feature of the structure outlined above is the self-centering character of the scalloped shape of disc 11a. If for any reason (for example, an uneven weight distribution or uneven wear in disc 11a) there should develop an uneven stress of disc 11a, such that some scallops receive more force than others, this uneven force would cause a slight shift in the position of disc 11a, thereby equalizing the stress on disc 11a and preventing disc 11a from becoming warped by the uneven stress.

The shape of the inner perimeter of disc 11a is relatively unimportant, although a circular shape, as illustrated, is preferred. The size of the opening should be sufficiently large, however, to allow unrestricted rotation of torque tube 12 when the brakes are not being applied.

Referring now to FIG. 4, a rotating friction disc 10c is illustrated. In this disc, the shape of the outer perimeter is relatively unimportant, and it is the inner perimeter which is significant. The outer perimeter should of course be sufficiently small so as to allow unrestricted rotation of the disc 10c within restraining structure 31 when the brakes are not being applied. A circular perimeter, as illustrated, is preferred, but this is not critical.

Formed in the inner perimeter of disc 10c are scallops 40, similar to the scallops 30 about the outer perimeter of stationary disc 11a, preferably equally spaced. Torque tube 12 is provided with scallops 42, which interfit between and engage disc scallops 40. As with scallops 30 and 32 of disc 11a and restraining structure 31, a limited amount of expansion and rotary motion are possible, for similar reasons. Again, a loose working fit, i.e., about 0.005 inch per inch of radius of disc 10c, is sufficient clearance for this purpose, but a greater clearance can be used if desired.

Figure 6:
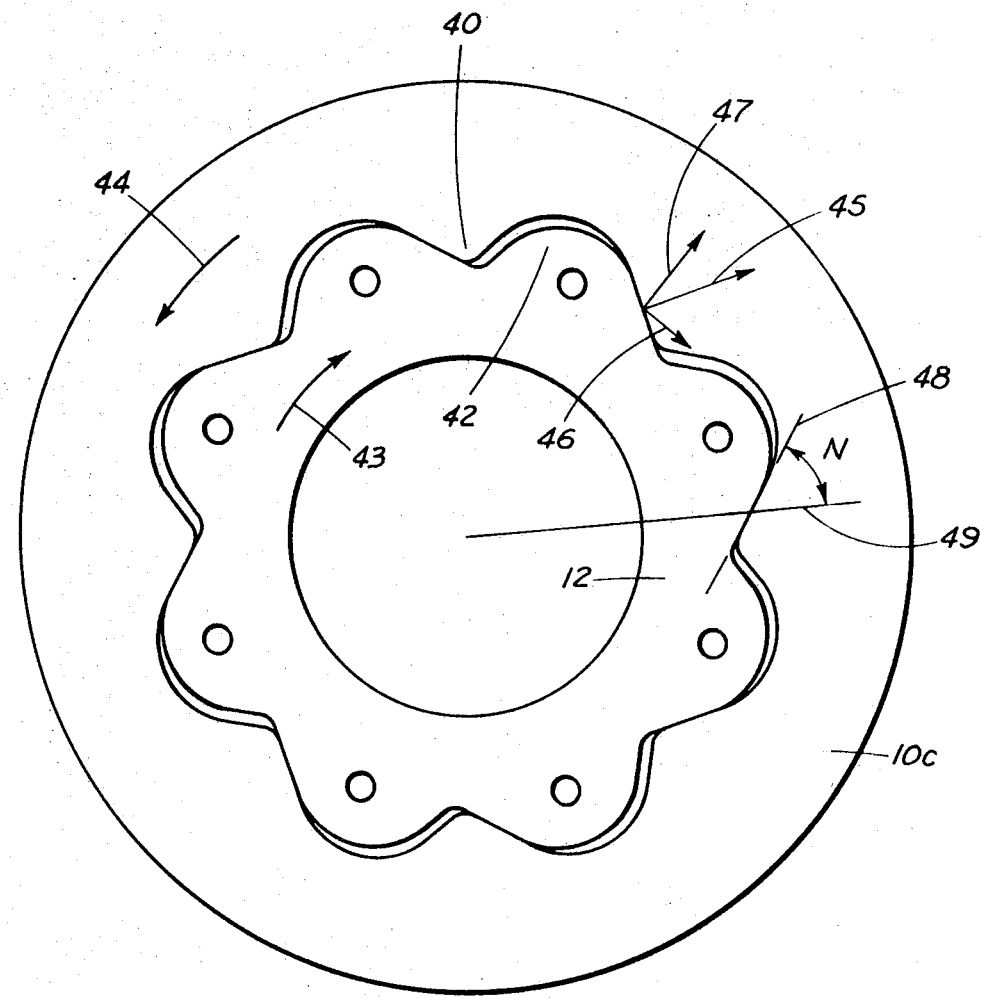
FIG. 6 is a schematic diagram of the rotating disc of FIG. 4, illustrating the angle of contact between the rotating body and the rotating disc, and the resolution of forces incident upon the rotating disc.

The directions of thrust exerted by disc 10c and torque tube 12 are illustrated in FIG. 6. Clockwise rotating torque tube 12, as illustrated by arrow 43, presses against and rotates disc 10c clockwise. When braking is applied, friction between stationary discs 11b and 11c and rotating disc 10c produces a counterclockwise thrust in disc 10c, indicated as arrow 44. The opposite thrusts 43 and 44 produce a force upon disc 10c, approximately perpendicular to the contact surface, which is indicated by arrow 45, having a tangential component 46 and a radial component 47. The relative magnitudes of these tangential and radial components are determined by the angle N of contact between disc 10c and torque tube 12, measured as the angle between the contact surface, indicated by line 48, and the radius passing through the center of the contact surface, indicated by line 49. As with angle M in FIG. 5, the angle of contact N should be nearly the same for all scallops 40 and should be selected to distribute force 45 in proportion to the strengths of the friction disc. In the case of rotating disc 10c, however, the radial stress 47 is borne by the tensile strength of disc 10c, as compared to the compressive strength of disc 11a, so that the first approximation of angle N should be such that the cotangent of N approximates the ratio of the effective shear and tensile strengths of the material of disc 10c. In general, angle N should range from about 30° to about 60°, depending on the relative shear and tensile strengths of the material of disc 10c. Like angle M in FIG. 5, the exact value of angle N depends on many factors and its exact value is determined by experiment, using the above analysis as a first approximation.

Throughout the above description, reference has been made to aircraft brakes. The invention is equally applicable, however, to other types of disc brakes, i.e., in other types of vehicles or in nonvehicular applications. The invention has its greatest utility in brakes whose discs comprise ceramic type (i.e., nonductile) materials such as carbon.

Reference has also been made to stationary discs having external scalloping, and rotating discs having internal scalloping. This situation could of course be reversed, i.e., a disc of the configuration of disc 11a in FIG. 3 could be used as a rotating disc and a disc of the configuration of disc 10c in FIG. 4 could be used as a stationary disc, with the appropriate modifications in the balance of the brake structure.

The preferred material for friction discs 10a–10f and 11a–11 is carbon, e.g., Carbitex (trademark) reinforced carbon bodies manufactured and sold by The Carborundum Company at Sanborn, New York. Other nonductile friction materials can also be used, however.

The term "carbon" as used herein is to be construed in the broad sense as meaning not only the various forms and grades of noncrystalline or amorphous carbon, but also the various forms and grades of partially or fully graphitized carbon. It is generally recognized that there is no sharp or distinct dividing line, crystallographically speaking, between commercial grades of amorphous carbon and graphite, but there are various degrees of graphitization in carbon bodies, depending on the methods of fabrication, and particularly the thermal history of a particular carbon body. For purposes of this invention no distinction need be drawn between the two, and where reference is made to carbon, graphite is included. Also included are carbon bodies containing various additives to improve the coefficient of friction, strength, or other properties of the carbon.

I claim:

1. In combination in a disc brake, a friction disc consisting essentially of carbon and a coaxially aligned coacting element, (1) the friction disc having an inner perimeter and an outer perimeter, one perimeter having formed therein a plurality of equally spaced scallops, each scallop having a substantially flat contact surface disposed at an angle with respect to the radius of the friction disc passing through the center of the contact surface of the friction disc, such angle of each contact surface being substantially equal to each other such angle, and having a cotangent which approximates the ratio of the strengths which bear stress within said disc and (2) the coacting element having a perimeter for engagement with the scalloped perimeter of the friction disc, said coacting element perimeter having formed therein a plurality of equally spaced scallops, equal in number to the friction disc scallops, each coacting element scallop having a substantially flat contact surface disposed at substantially the same angle with respect to the radius of the friction disc passing through the center of the contact surface as the angle of the corresponding contact surface of the friction disc; the friction disc scallops interfitting between the coacting element scallops and being capable of limited expansion and rotary movement therebetween; a loose working fit being provided between the friction disc and its coacting element.

2. In combination in a disc brake, (1) a plurality of internally scalloped friction discs; consisting essentially of carbon, said scallops being equally spaced and each having a substantially flat contact surface disposed at an angle with respect to the radius of the disc whose cotangent approximates the ratio of the shear strength of the carbon to the tensile strength of the carbon; (2) an externally scalloped element, coaxially aligned with and coacting with the internally scalloped friction discs; (3) a plurality of externally scalloped friction discs, consisting essentially of carbon, said scallops being equally spaced and each having a substantially flat contact surface disposed at an angle with respect to the radius of the disc whose cotangent approximates the ratio of the shear strength of the carbon to the compressive strength of the carbon, coaxially aligned with and alternately spaced between the internally scalloped friction discs; (4) an internally scalloped element coaxially aligned with and coacting with the externally scalloped friction discs; and (5) means for urging the friction discs into mutual contact, whereby to arrest rotary motion of one coacting element with respect to the other coacting element; a loose working fit being provided between each scalloped friction disc and its coacting element.

3. A friction disc for use in a disc brake, the disc consisting essentially of carbon and having an inner perimeter and an outer perimeter, one perimeter having formed therein a plurality of equally spaced scallops, each scallop having a substantially flat contact surface disposed at an angle with respect to the radius of the friction disc passing through the center of the contact surface of the friction disc, such angle of each contact surface being substantially equal to each other such angle, and having a cotangent which approximates the ratio of the strengths which bear stress within said disc.

4. The friction disc of claim 3, wherein the scalloped perimeter is the outer perimeter of the friction disc, said angle having a cotangent which approximates the ratio of the shear and compressive strengths of said disc.

5. The friction disc of claim 3, wherein the scalloped perimeter is the inner perimeter of the friction disc, said angle having a cotangent which approximates the ratio of the shear and tensile strengths of said disc.

* * * * *